United States Patent Office
3,087,863
Patented Apr. 30, 1963

3,087,863
AMINO ACID SYNTHESIS
Wei Hwa Lee, Urbana, Ill., and Robert C. Good, Cincinnati, Ohio, assignors to International Minerals & Chemical Corporation, a corporation of New York
No Drawing. Filed June 27, 1961, Ser. No. 118,238
15 Claims. (Cl. 195—47)

This invention relates to the preparation of L-glutamic acid, and more particularly relates to the preparation of L-glutamic acid from carbohydrates utilizing biological means.

In order to meet the increasing demand for monosodium glutamate as a food flavor-enhancing additive, the art has conducted an extensive investigation into methods of producing L-glutamic acid. Means of obtaining glutamic acid from natural sources, means for the chemical synthesis of glutamic acid, and means for the biological synthesis of glutamic acid all have been considered closely.

Historically, glutamic acid has been obtained by hydrolysis of naturally occurring proteins, such as wheat gluten or by recovery from Steffens liquors. It has become increasingly apparent, however, that the potential of such processes is not sufficient to meet contemplated demand.

The chemical synthesis of glutamic acid results in the formation of racemic DL-glutamic acid mixtures. Accordingly, investigations directed to chemical processes must not only devise an efficient conversion of inexpensive reactants to glutamic acid but must also establish an efficient means of resolving the racemic mixture. The difficulties which obtain have prompted further investigation into biological means for the production of glutamic acid.

Research in the biological area has, in turn, followed several lines of inquiry. The possibility of transamination has been recognized and it has been demonstrated that glutamic acid can be produced by transamination utilizing microorganisms in conjunction with alpha-ketoglutaric acid and aspartic acid or the like. Such processes necessarily utilize rather expensive starting materials and the amino acid reactant is sacrificed in the process.

The art has also investigated the possibility of producing glutamic acid from alpha-ketoglutaric acid, citric acid, and the like utilizing an inexpensive ammonium source, such as ammonia or urea. While this approach has the advantage of using an inexpensive nitrogen source, it still requires the presence of a relatively expensive principal starting material.

Bottomed on the premise that a potentially attractive process should employ a principal starting material which is both plentiful and inexpensive, a substantial amount of investigation has been undertaken directed to fermentation utilizing carbohydrates, such as sugar or starch. Desirably such utilization is coupled with a readily available nitrogen source such as ammonia or urea. This approach employing an inexpensive principal starting material appears to afford the greatest ultimate potential.

Investigation of carbohydrate fermentation to produce glutamic acid has been conducted utilizing a wide variety of microorganisms. Often attention has been directed merely to determining which microorganism would produce an identifiable amount of glutamic acid from a nutrient medium containing a carbohydrate and a nitrogen source. As an outgrowth of such investigations a substantial number of microorganisms have been identified as glutamic acid producers. While some investigators confined their conclusions to the species tested, others identified glutamic acid producing microorganisms broadly by genus. Such investigations were not limited to bacteria alone but included fungi and yeasts as well. It is possible by means of the reported investigations to substantiate that, inter alia, members of the following microbial genera will produce glutamic acid from carbohydrates.

Bacterial genera—Acetobacter, Aerobacter, Aeromonas, Bacillus, Brevibacteria, Escherichia, Gluconoacetobacter, Lactobacillus, Micrococcus, Pseudomonas, Rhizobium, Salmonella, Sarcina, Serratia, Streptococcus, Streptomyces, Xanthomonas;

Fungi—Aspergillus, Cephalosporium, Mucor, Neurospora, Penicillium, Rhizopus, Ustilago;

Yeasts—Cryptococcus, Endomyces, Monilia, Mycoderma, Pichia, Pullularia, Rhodotorula, Schizosaccharomyces, Sporobolomyces, Torulopsis, Willia, and Zygosaccharomyces.

On the basis of these results it appears that a great number, perhaps a majority, of microorganisms produce at least trace amounts of glutamic acid.

A closer analysis of the work undertaken, however, indicates that the literature fails to provide any guide for the selection of a board group of microorganisms that will produce glutamic acid in quantities which suggest potential commercial significance. For example, only 20% of 650 bacteria tested in one investigation produced more than trace amounts of glutamic acid. Of the 20%, most produced only a few mg. of glutamic acid per ml. of medium and only one species reportedly converted as much as 30% of the sugar from a fermentation medium which originally contained 5% sugar. Since commercially practical processes should provide at least about 50%, and desirably at least about 60%, conversion of a medium containing as much as 15% or 20% sugar, it will be apparent that much of the published information with respect to the fermentation of carbohydrates to provide glutamic acid has no real value when considered in the light of commercial requirements.

At least two investigators have indicated that species of the genus Micrococcus have the ability to accumulate glutamic acid. *Micrococcus glutamicus* has been said to provide about a 46% conversion of glucose from a fermentation medium containing 10% glucose and *Micrococcus varians* has been said to provide about 17% yield from a 2% glucose solution.

Microorganisms of the species *Bacillus megateriumcereus* intermediate type also have been reported as converting as much as 51% of glucose from dilute 3% glucose fermentation mediums and *Brevibacterium lactofermentus* has been said to provide yields of 54% from 10% glucose mediums in laboratory flasks.

In its quest for microorganisms which will convert sugar in significant quantities to glutamic acid, the art, except for a few isolated species, is faced with the problem of selecting microorganisms at random from the literally unnumbered species which exist.

It is a primary object of the present invention to prepare glutamic acid by a microbiological method which provides high yields.

It is another object of this invention to prepare L-glutamic acid from inexpensive starting materials.

It is still another object of this invention to prepare L-glutamic acid by a simple fermentation method.

It is yet another object of this invention to prepare L-glutamic acid by employing only a single fermentation step.

It is a further object of this invention to prepare L-glutamic acid in high yields and at low cost.

The present invention embraces the method for preparing L-glutamic acid which comprises aerobically fermenting an aqueous carbohydrate medium containing a nitrogen source and a biological catalyst system produced by a microorganism selected from the group consisting of *Corynebacterium lilium* and *Corynebacterium callunae* and recovering L-glutamic acid therefrom.

In the practice of this invention either the organisms themselves may be employed or alternately an extract of the organisms which contains the active catalytic material may be employed for the fermentation. The term "fermentation" as used herein is intended to refer to a process in which the conversion of the defined substrate into the product is effected either by the action of the defined class of microorganisms or by a biological catalytic system elaborated by such organisms. The extract may be prepared by a mechanical maceration, treatment with ultrasonic waves, extraction with a suitable solvent or by other techniques known to the art. Yields substantially in excess of 50% of theory have been achieved following the practice of this invention.

The organisms employed in the practice of this invention have been given the name of *Corynebacterium lilium* and *Corynebacterium callunae*. It will be apparent that the effectiveness of the organisms may be susceptible to improvement by treatment with X-rays, ultraviolet light, or by other means which are known to produce mutations and alterations in the characteristics of microorganisms. Accordingly, the terms "*Corynebacterium lilium*" and *Corynebacterium callunae*" as employed herein include these organisms as well as mutants and the like derived therefrom.

The organisms within the contemplation of this invention, *Corynebacterium lilium* and *Corynebacterium callunae*, typically are made up of short, pleomorphic Gram-positive rods, some club shaped, others beaded or banded with metachromatic granules. In broth cultures, a small portion (generally less than about 5%) of the younger organisms (18 hours old or less) are Gram-negative and in older cultures (over 70 hours) somewhat more Gram-negative organisms exist. The organisms are non-motile, and no flagella have been observed. Spor formation has not been detected. On nutrient agar, the organisms exhibit moderate growth in 24 hours at 30° C., producing creamy white to yellow (in the light) colonies with dry, wrinkled, full, entire edges. On TGY-agar medium, they grow well, producing glistening, filiform growth. Colonies are circular, entire, slightly unbonate, yellow when grown in light, creamy white to very slightly yellow when grown in the dark. When grown on tellurite agar the organisms exhibit rapid growth and produce gray colonies with darker centers, typical of Corynebacteria.

*Corynebacterium lilium* has the following physiological properties:

(1) Cells: 0.4 to 0.8 by 0.7 to 5.7 microns.
(2) Optimum temperature for L-glutamic acid production: 25–35° C. Good growth at temperatures up to about 37° C.; slight at 40° C.; no growth at 41° C.
(3) pH range: 5–9; optimum 6–8.
(4) Aerobic.
(5) Produce acid, no gas, from dextrose, fructose, maltose, sucrose, mannose, galactose (trace reverting to alkaline at 72 hours), trehalose (trace becoming strong positive at 2–3 weeks), inulin (trace to slow positive reverting to negative at 2 weeks), mannitol (trace to slow positive, variable), and inositol (trace to slow positive, variable). (Brom thymol blue indicator.)
(6) Produce no acid or gas from arabinose, lactose, raffinose, dulcitol, salicin, rhamnose, sorbose, melibose, melezitose, xylose, adonitol, sorbitol, glycerol, dextrin, and starch. (Brom thymol blue indicator.)
(7) Gelatin: not liquified.
(8) Indole: not produced.
(9) Hydrogen sulfide: not produced.
(10) Acetyl methyl carbinol (Voges Proskauer Test): not produced.
(11) Methyl red: doubtful.
(12) Citrate: weak positive.
(13) Catalase: positive.
(14) Urease: positive.
(15) Litmus milk: no change in 14 days; alkaline after 25 days; no digestion.
(16) Nitrate reduction: positive.

The characterization of *Corynebacterium callunae* and *Corynebacterium lilium* was according to the Manual Microbiological Methods, Soc. Am. Bact., McGraw-Hill (1957).

*Corynebacterium callunae* varies from the above characteristics in that *Corynebacterium callunae* produces acid, no gas (without reversion), from galactose, raffinose and salicin; *Corynebacterium callunae* provides a strong positive methyl red test (pH 5.0); and *Corynebacterium callunae* does not reduce nitrate.

The microorganisms employed in the present invention are conveniently maintained on conventional TGY (tryptone-glucose-yeast extract) agar slants. In the preparation of a suitable inoculum, a tranfer is made from a slant to a small amount of TGY broth and incubated 15 to 30 hours at 28–30° C. with suitable aeration. A portion of the resulting culture is transferred to additional TGY or other suitable broth to provide from about 2 to about 10% of the culture based on the total mixture, and the mixture is incubated under conditions within the range previously employed, and thereby producing a suitable inoculum.

A satisfactory fermentation medium for the active growth of Corynebacteria and for the production of I glutamic acid corresponds generally to standard nutrien mediums and contains water, a suitable sugar, a nitrogen source, calcium, magnesium, potassium, phosphate, sulfate, auxiliary growth factors, and minor elements. The medium may also include a mild, non-toxic alkali or buffer for pH adjustment and maintenance. One typical medium may have the following composition.

|  | Suitable range | Preferred |
|---|---|---|
| Sugar | 1–25% by wt. | 5–20% by wt. |
| (NH₄)₂SO₄ | Trace–15% | 0.05–10%. |
| Biotin | Variable, mcg./l. | Variable, mcg./l. |
| K₂HPO₄ (or KH₂PO₄ or mixture) | 0.01–1% | 0.05–0.4%. |
| MgSO₄·7H₂O | 0.05–0.3% | 0.1–0.2%. |
| CaCl₂ | Trace | Trace. |
| Minor elements | Trace | Trace. |
| Ammonia | Maintain pH | Maintain pH. |

While the above constitutes one satisfactory medium, it will be appreciated that the precise make-up of any medium will vary depending upon exact pH, aeration, or the like employed. Accordingly, it is not intended that the present invention be limited to the utilization of the medium defined above.

The invention generically contemplates fermentation mediums containing carbohydrates including starches, dextrins, sugars, and the like.

Sugars, such as glucose, sucrose, fructose, maltose, and the like, as well as mixtures of such sugars, most appropriately may be employed in the practice of this invention. Glucose and sucrose constitute particularly preferred materials for this invention. As employed herein, the terms "sugar," "starch," and the like embrace not only such materials, per se, but their obvious equivalents. For example, the term "glucose" embraces materials such as "Cerelose" (Corn Products Company) and "Clintose" (Clinton Corn Processing Company), which are commercially available forms of glucose monohydrate prepared by hydrolysis of corn starch. The terms also embrace invert sugar mixtures, such as those prepared by acid conversion of sugars in a known manner. It will be apparent that a portion or all of the sugar required may be added to the medium, as molasses.

The carbohydrates are employed in the fermentation medium in amounts of at least about 1% and preferably at least about 5% by weight. Desirably the medium will contain from about 5% to about 20% carbohydrate although significant yields can be obtained employing fermentation mediums containing up to about 25% and above. It will be apparent that the precise proportion of carbohydrate employed in the medium will be a matter of choice.

The medium also will contain a standard nitrogen source, such as ammonia, urea, or other assimilable nitrogen source, either organic or inorganic. Various ammonium compounds can be used, including the chloride, sulfate, phosphate, and others. The nitrogen and phosphate can be added together as an ammonium phosphate, or separately, as desired. Preferably, at least sufficient nitrogen is present to supply nitrogen for cell growth and for theoretical conversion of all the carbohydrate to glutamic acid. The total nitrogen source can be added at the outset or can be added periodically during the fermentation.

The auxiliary growth factors can be added in the form of pure biotin, or biotin equivalent (i.e., a substance having the biological action of biotin), or in the form of a biotin precursor compound (i.e., a substance which is converted biotin or a biotin equivalent under the fermentation conditions). Suitable sources of the auxiliary growth factors which may be used alone or in combination include meat extract, peptone, corn steep water, beet molasses, sugar cane molasses, and a commercially available product known as "Protopeptone No. 366," supplied by Wilson & Company. Many of the above materials also supply minor elements.

Routine tests have determined that the optimum concentration of the auxiliary growth factors will vary depending upon the amount of carbohydrate present in the fermentation medium. For example, optimum concentration of biotin for a 5% sugar medium is from about 1.5 to about 2 mcg./l., 10% sugar requires 2 to 3 mcg./l., 15% sugar requires 4 to 8 mcg./l., and 20% sugar requires 7 to 10 mcg./l. Inasmuch as naturally occurring substrates, such as beet molasses, sugar cane molasses, corn steep water and the like contain small amounts of biotin and/or equivalent materials, this fact should be taken into account in the preparation of the fermentation medium containing such materials.

A variety of calcium, potassium, and magnesium salts may be employed in the fermentation medium including the chlorides, sulfates, phosphates, and the like. Similarly, phosphate and sulfate ions can be supplied as any of a variety of salts. While salts which supply both the desired anion and cation may be employed (e.g., potassium phosphate, magnesium sulfate) the selection is by no means so limited. Again, such materials are conventional in fermentation mediums and the selection of specific materials as well as their proportion is within the skill of the routineer.

The so-called "minor elements" are commonly understood to include manganese, iron, zinc, cobalt, and possibly others. Trace quantities thereof are required, and such quantities are commonly present in the materials used in the preparation of fermentation mediums.

Finally, the medium will contain a non-toxic alkali or buffer to maintain the pH in the desired range. Once more a wide variety of non-toxic materials may be utilized. Because they are readily available, calcium carbonate and ammonia (gaseous or aqueous) often are employed to maintain the pH of fermentation mediums.

At the outset of the process, the fermentation medium is inoculated with a culture of the microorganism, while the pH is maintained between about 5 and about 9 and desirably between about 6 and about 8. The amount of culture employed may vary widely but often is from about 0.5% to about 15% by volume and advantageously from about 2% to about 10% by volume. During the initial stages of the fermentation, the organism grows rapidly. After the initial period, often 10 to 20 hours, the rate of growth of the organism tends to decrease and the accumulation of glutamic acid occurs in significant quantity. During the accumulation of glutamic acid in the medium the pH should be maintained between about 6 and about 8. The fermentation ordinarily is continued until the accumulation of L-glutamic acid reaches a maximum and then is terminated. The total time for the fermentation, will, of course, vary depending upon such factors as nutrient composition, pH, temperature, proportion of inoculum, and the like. Often, maximum glutamic acid accumulation will occur between about 30 or 50 and about 100 hours although some processes may terminate either earlier or later.

For effective fermentation the temperature of the medium is maintained between about 20° C. and about 40° C. and preferably between about 25° C. and about 35° C. Fermentation with active cells should be carried out with active aeration produced by shaking, stirring, sparging, or the like, effective to produce an oxygen absorption rate of at least about 0.1 millimole per liter of medium per minute. The selection of optimum oxygen absorption rates is well within the skill of the art.

In the event that the catalytic system is employed rather than the organism, the fermentation time will be decreased by the time period during which the organism undergoes rapid growth. The fermentation medium will be the same as that employed for a live organism.

The recovery of L-glutamic acid from the fermentation liquor can be carried out by conventional means with little or no modification. In one acceptable recovery process, the liquor is first filtered to remove suspended solids. It may then be treated by one of a variety of ways to remove slimes or to reduce the concentration thereof. For example, it can be treated with a small proportion of tannin or alkali lignin, as disclosed in Hoglan U.S. Patent 2,487,807 (November 15, 1949) and in Blish U.S. Patent 2,487,785 (November 15, 1949). Alternatively it can be concentrated to a solids level of about 25–45% by weight, then commingled with a small proportion of barium chloride, barium hydroxide, or the like at a pH above 7 to precipitate organic impurities, as disclosed in Purvis-Fike U.S. Patent 2,796,433 (June 18, 1957). The purified liquor is then concentrated and adjusted to about pH 3.2 with sulfuric acid, hydrochloric acid, or the like, at which point L-glutamic acid crystallizes therefrom in good yield.

It has been found that, particularly with the higher concentration of sugars, bound glutamic acid as well as glutamic acid itself, may be produced by the organisms. Accordingly, if desired, the fermentation medium may be subjected to hydrolysis in order to hydrolyze the compounds to free glutamic acid. Once again, the hydrolysis may be carried out by conventional means such as, for example, the acid hydrolysis dislosed in U.S. Patent 2,548,124. In the event that the medium and fermentation conditions employed yield no or only insignificant quantities of bound glutamic acid values, then, of course, hydrolysis need not be employed.

The following examples are included in order more fully to demonstrate the practice of this invention. These examples are included for illustrative purposes only and in no way are intended to limit the scope of the invention.

EXAMPLE I

A 500-gallon fermentation tank was filled with a standard fermentation medium containing 10% "Cerelose" (92% glucose) and was inoculated with 5% inoculum by volume containing the organism *Corynebacterium lilium*. The fermentation medium was agitated and aerated while maintaining the pH between 6 and 8 to provide a final fermentation liquor having the characteristics reflected by column A of Table 1 below.

The fermentation was repeated employing a fermentation medium containing 15% "Cerelose." The results of this fermentation are reflected in column B of Table 1 below.

Table 1

|  | A | B |
|---|---|---|
| Initial "Cerelose" Concentration, percent | 10 | 15 |
| Final Fermentation Liquor: | | |
| Glutamic Acid,[1] mg./ml | 42.9 | 60 |
| Dry Solids, percent | 7.8 | 10.2 |
| Specific Gravity | 1.028 | |
| Theoretical Conversion from Glucose, percent | 57 | 53 |
| Concentrate of Fermentation Liquor: | | |
| Glutamic Acid, mg./ml | 253 | 205 |
| Free Glutamic Acid, percent | 60 | 56 |
| Bound Glutamic Acid, percent | 40 | 44 |
| Dry Solids, percent | 40 | 44.7 |
| Specific Gravity | 1.163 | |

[1] Glutamic acid and bound glutamic acid compounds expressed as free glutamic acids.

EXAMPLE II

A fermentation medium was prepared having the following composition:

Medium: Gm./l.[1]
"Cerelose" _____ 220 (20% glucose)[2]
Molasses _____ 10
$(NH_4)_2SO_4$ _____ 10
$KH_2PO_4$ _____ 3
$MgSO_4 \cdot 7H_2O$ _____ 1
$CaCl_2$ _____ 0.33
"Protopeptone 366" _____ 2
Biotin _____ mcg__ 3

[1] Tables set forth gm./l. unless otherwise noted. (mg.=milligrams; mcg.=micrograms).
[2] Approximately 20% glucose concentration in the medium.

Six liters of the medium was inoculated with 10% by volume of a TGY culture of *Corynebacterium lilium*. The fermentation medium was subjected to aeration (5 l./min.) and agitated at 300 r.p.m. at 30° C. while the pH was maintained at about 6.6 with $NH_4OH$. After 99 hours, the medium was hydrolyzed and provided a yield of 80 mg./ml. of L-glutamic acid, which corresponds to a yield of 47%.

EXAMPLE III

A fermentation medium was prepared having the following composition:

Medium: Gm./l.
"Cerelose" _____ 163 (15% glucose)
$(NH_4)_2SO_4$ _____ 10
$KH_2PO_4$ _____ 2
$MgSO_4 \cdot 7H_2O$ _____ 2
Calcium glutamate _____ 0.56
Ferric ammonium citrate _____ mg__ 60
$MnSO_4 \cdot H_2O$ _____ mg__ 200
$Zn(C_2H_3O_2)_2 \cdot 2H_2O$ _____ mg__ 5
"Protopeptone No. 366" _____ 3
Biotin _____ mcg__ 3.5

Seven liters of the medium was inoculated with 10% by volume of a TGY culture of *Corynebacterium lilium* (inoculum described in Example IX). The fermentation medium was subjected to aeration (7 l./min.) and agitated at 450 r.p.m. at 30° C. The pH was maintained at 7 with ammonia gas. After 40.5 hours, the medium was hydrolyzed and provided a yield of 70.5 mg./ml., which corresponds to a yield of 57.6%.

EXAMPLE IV

A fermentation medium was prepared having the following composition:

Medium: Gm./l.
"Cerelose" _____ 108 (10% glucose)
$(NH_4)_2SO_4$ _____ 10
$K_2HPO_4$ _____ 2
$MgSO_4 \cdot 7H_2O$ _____ 2
$CaCl_2$ _____ 0.33
Biotin _____ mcg./l__ 0.6
Minor elements ($Fe^{++}$, $Mn^{++}$) _____ Trace Six liters of the medium was sterilized and thereafter inoculated with 10% by volume of a TGY culture of *Corynebacterium lilium*. The fermentation medium was aerated (6 l./min.) and agitated at 300 r.p.m. at 35° C. while the pH was maintained at about 6.6 with ammonia gas. After 52 hours, the medium was hydrolyzed and provided 44 mg./ml. of L-glutamic acid corresponding to a 54% yield.

EXAMPLE V

A TGY-agar slant culture of *Corynebacterium lilium* was transferred to 10 milliliters of TGY broth in a test tube and incubated with agitation at 30° C. for 16.5 hours. The resulting culture was added at 2% by volume concentration to a larger quantity of TGY broth, which was incubated 15.75 hours at 30° C. to produce the inoculum culture.

A fermentation medium was prepared from stock solutions having compositions as follows.

Solution A:
Ammonium sulfate _____ grams__ 20
Meat extract _____ do____ 2
Peptone _____ do____ 2
$MgSO_4 \cdot 7H_2O$ _____ do____ 1
$K_2HPO_4$ _____ do____ 1
$CaCO_3$ _____ do____ 20
Water _____ milliliters__ 500

Solution B:
"Cerelose" _____ grams__ 54
Water to make 500 milliliters.

Solutions A and B were sterilized and mixed aseptically. The completed medium, containing 5% glucose and having a pH of 8, was inoculated with 2% by volume of the inoculum culture and fermented at 28° C. in a 14-liter vessel equipped with an agitator operating at 300 r.p.m. Air was introduced at the rate of 12 liters per minute through a sparger pipe located near the bottom of the liquid. A silicone antifoam agent was added manually as needed to control the foaming. The fermentation liquor was sampled from time to time and analyzed for free L-glutamic acid content by the L-glutamic acid decarboxylase method.

Three fermentations were carried out according to the foregoing procedure, utilizing 4, 6, and 8 liters of fermentation medium. The results were as follows:

| Volume of medium, liters | 4 | 6 | 8 |
|---|---|---|---|
| Air rate, l./l./min | 3 | 2 | 1.5 |
| L-GA analysis, mg./ml.: | | | |
| 24 hours | 8.7 | 7.0 | 8.2 |
| 36 hours | 12.0 | 13.2 | 15.6 |
| 48 hours | 10.4 | 17.2 | 22.2 |
| 60 hours | 21.4 | 19.8 | 23.4 |
| 70 hours | 22.8 | 20.8 | 22.4 |
| 89 hours | 26.4 | 23.6 | 23.4 |

While the above indicates that aeration is not a significant factor with the medium employed, it has been found that variation of aeration has a more pronounced effect with some other mediums, particularly at higher sugar concentrations.

EXAMPLE VI

The following example illustrates the production of L-glutamic acid from "Cerelose" at pH 6.9.

A fermentation medium was prepared from stock solutions having compositions as follows.

Solution A:
"Cerelose" _____ grams__ 165
$MgSO_4 \cdot 7H_2O$ _____ do____ 3
$CaCl_2$ _____ do____ 0.3
Water to make 1500 milliliters.

Solution B:
Ammonium sulfate _____ grams__ 30
$K_2HPO_4$ _____ do____ 3
Peptone _____ do____ 3
Meat extract _____ do____ 3
Water _____ milliliters__ 1500

The solutions were autoclaved separately, commingled, inoculated with 2% of a TGY culture of *Corynebacterium lilium*, and fermented at 30° C. with an agitator rate of 400 r.p.m. and an aeration rate of 2 liters of air per minute. Concentrated ammonium hydroxide solution was added as required to maintain the pH at about 6.9, a total of 150 ml. being used for this purpose over a total fermentation time of 52 hours. A silicone antifoam agent was added manually as needed to control the foaming. Periodic analyses of the fermentation liquor gave the following results.

| Fermentation time: | Free L-GA concentration, mg./ml. |
|---|---|
| 10.5 hours | 2.2 |
| 19 hours | 7.5 |
| 24 hours | 9.0 |
| 28 hours | 16.8 |
| 36 hours | 23.2 (57% yield) |
| 47 hours | 19.2 |
| 52 hours | 22.0 |

EXAMPLE VII

The following example illustrates the use of a medium containing urea as a nitrogen source.

A medium was prepared from stock solutions having the following compositions.

Solution A:
| "Cerelose" | grams | 55 |
|---|---|---|
| $MgSO_4 \cdot 7H_2O$ | do | 0.2 |
| Brom cresol blue | milligrams | 10 |
| $CaCO_3$ | grams | 20 |
| Water | milliliters | 500 |

Solution B:
| Ammonium sulfate | grams | 10 |
|---|---|---|
| $K_2HPO_4$ | do | 1 |
| Urea | do | 1 |
| Meat extract | do | 1 |
| Water | milliliters | 500 |

Solutions A and B were sterilized separately, then mixed, the quantities employed being sufficient to produce 3 liters of completed medium (5% glucose). The medium was inoculated with 1% by volume of a TGY culture of *Corynebacterium lilium* and fermented in a 4-liter vessel at 30° C. The medium was agitated at 180 r.p.m., sparged with air at 2 liters per minute, and adjusted intermittently to pH 6-7 with an aqueous 20% solution of urea. Periodic analyses of the fermentation liquor gave the following results.

| Fermentation time: | Free L-GA concentration, mg./ml. |
|---|---|
| 24 hours | 2.2 |
| 32 hours | 3.6 |
| 48 hours | 8.2 |
| 84 hours | 14.0 |
| 96 hours | 16.4 (40% yield) |

EXAMPLE VIII

A fermentation medium was prepared having the following composition.

| Medium: | Gm./l. |
|---|---|
| Glucose | percent 5 |
| Ammonium sulfate | 2 |
| Meat extract | 0.2 |
| Peptone | 0.2 |
| $K_2HPO_4$ | 0.1 |
| $MgSO_4 \cdot 7H_2O$ | 0.1 |
| $CaCO_3$ | 2 |
| Water | Remainder |

A 50-ml. portion of the medium was sterilized, inoculated with 2% by volume of a TGY of *Corynebacterium lilium*, and incubated at 30° C. in a 250-ml. Erlenmeyer flask on a rotary shaker. At the end of 5 days, the fermentation liquor had an L-glutamic acid content of 36.2 mg./ml., analyzed by the L-glutamic acid decarboxylase method, corresponding to a glucose conversion of 88.5% of theory.

EXAMPLE IX

A fermentation medium was prepared having the following composition.

| Medium: | Gm./l. |
|---|---|
| "Cerelose" | 108 (10% glucose) |
| $(NH_4)_2SO_4$ | 40 |
| $MgSO_4 \cdot 7H_2O$ | 2 |
| $K_2HPO_4$ | 2 |
| Ferric ammonium citrate | mg 60 |
| Biotin | mcg 1.4 |
| $CaCO_3$ | 60 |
| Trypticase | 1 |

A 100-ml. portion of the sterilized medium was inoculated with 10 ml. (10% by volume) of a culture of *Corynebacterium lilium*. The inoculum employed had the following composition.

| Medium: | Gm./l. |
|---|---|
| "Cerelose" | 5.0 of glucose |
| Urea | 0.5 |
| $K_2HPO_4$ | 1.0 |
| $MgSO_4 \cdot 7H_2O$ | 1.0 |
| Ferric ammonium citrate | mg 30.0 |
| Biotin | mcg 5.0 |

The inoculated medium was agitated at 30° C. in a 500-ml. Erlenmeyer flask on a rotary shaker for 100 hours. The hydrolyzed medium contained 48.8 mg./ml. of L-glutamic acid, which corresponds to a 60% yield.

EXAMPLE X

A fermentation medium was prepared having the following composition.

| Medium: | Gm./l. |
|---|---|
| "Cerelose" | 162 (15% glucose) |
| $(NH_4)_2SO_4$ | 60 |
| $MgSO_4 \cdot 7H_2O$ | 2 |
| $K_2HPO_4$ | 2 |
| Ferric ammonium citrate | mg 60 |
| Biotin | mcg 5 |
| Trypticase | 1 |
| $CaCO_3$ | 60 |

A 100-ml. portion of the sterilized medium was inoculated with 10 ml. of the inoculum of Example IX and agitated at 30° C. in a 500-ml. Erlenmeyer flask on a rotary shaker for 66 hours. The fermentation medium after hydrolysis contained 68 mg./ml. of L-glutamic acid, which corresponds to a yield of 57%.

EXAMPLE XI

A test essentially duplicating Example VIII, but employing sucrose instead of "Cerelose" as the sugar, gave a fermentation liquor containing 32 mg./ml. of L-glutamic acid at the end of 5 days, corresponding to a sucrose conversion of 75% of theory.

EXAMPLE XII

A fermentation medium was prepared having the following composition.

| Medium: | Gm./l. |
|---|---|
| Sucrose | 100 (10% sucrose) |
| Ammonium sulfate | 40 |
| Biotin | mcg 1.5 |
| $K_2HPO_4$ | 2 |
| $MgSO_4 \cdot 7H_2O$ | 2 |
| Ferric ammonium citrate | mg 60 |
| $CaCO_3$ | 60 |

A 100-ml. portion of this sterilized medium was inoculated with 10% by volume of the inoculum of Example IX containing a culture of *Corynebacterium lilium*. The inoculated medium was agitated at 30° C. in a 500-ml. Erlenmeyer flask on a rotary shaker for 72 hours. The hydrolyzed medium contained 54 mg./ml. of glutamic acid, which corresponds to 63% yield.

EXAMPLE XIII

The process of Example XII was repeated employing a medium which contained 15% sucrose and 2 mcg./l. biotin. After 114 hours, the hydrolyzed medium contained 76 mg./ml. of glutamic acid, which corresponds to a 59% yield.

EXAMPLE XIV

The process of Example VIII was repeated employing fructose instead of "Cerelose" as the sugar. The test provided a fermentation liquor containing 11.8 mg./ml. of L-glutamic acid at the end of 72 hours, corresponding to a fructose conversion of 29% of theory.

EXAMPLE XV

A fermentation medium was prepared having the following composition.

Medium: Gm./l.
Fructose _____ 100 (10% fructose)
Ammonium sulfate _____ 40
Biotin _____ mcg__ 1.8
$K_2HPO_4$ _____ 2
$MgSO_4 \cdot 7H_2O$ _____ 2
Ferric ammonium citrate _____ mg__ 60
$CaCO_3$ _____ 60

A 100-ml. portion of the medium was inoculated with 10% by volume of the inoculum of Example IX containing a culture of *Corynebacterium lilium*. The inoculated medium was agitated at 30° C. in an Erlenmeyer flask on a rotary shaker. The hydrolyzed medium contained 42 mg./ml. of glutamic acid, which corresponds to a 52% yield.

EXAMPLE XVI

The process of Example XV was repeated employing a fermentation medium which contained 15% fructose and 5 mcg./l. of biotin. After 65 hours, the hydrolyzed medium contained 58 mg./ml. of glutamic acid, which corresponds to 48% conversion.

EXAMPLE XVII

The process of Example VIII was repeated employing 5% maltose instead of "Cerelose" as the sugar and employing 50 ml. of the fermentation medium in a 250-ml. flask. After 66.5 hours, the hydrolyzed medium contained 14.4 mg./ml. of L-glutamic acid, corresponding to a maltose conversion of 35%.

EXAMPLE XVIII

The process of Example VIII was repeated with the exception that the meat extract and peptone were replaced with 0.8% of beet molasses. After 72 hours, the hydrolyzed fermentation liquor contained 25.4 mg./ml. of glutamic acid, corresponding to a conversion of 58%.

EXAMPLE XIX

The process of Example IX was essentially repeated except that the fermentation medium contained 0.3% pancreatic autolysate instead of the trypticase, 1 gm./l. yeast extract, and the organism employed was *Cornynebacterium callunae* after 66 hours, the hydrolyzed medium contained 26 mg./ml. of L-glutamic acid, corresponding to a 32% conversion.

EXAMPLE XX

A 100-ml. portion of a medium having the composition given in Example VIII was inoculated with 2% by volume of a TGY culture of *Corynebacterium callunae*, and the completed medium was fermented in a 500-ml. flask in a rotary shaker at 30° C. Analysis of the fermentation liquor for L-glutamic acid gave the following results.

Fermentation time: L-GA concentration
34 hours _____ mg./ml.___ 4.1
71 hours _____ 10.0 (25% conversion)
93.5 hours _____ 10.2

Numerous modifications of the described process will be apparent to one skilled in the art. Thus, for example, the materials may be sterilized separately or the inoculum may be formulated and then sterilized. Further, while the process has been described essentially as a batch fermentation, it may also be conducted as a continuous process, one fermentor serving as a stage for growth and subsequent fermentors serving for the conversion. Since these and other modifications will be apparent, it is intended that the present invention be limited only by the scope of the appended claims.

This application is a continuation-in-part of application Serial No. 801,720, filed March 25, 1959, entitled Amino Acid Synthesis. As indicated therein, the two preferred species of Corynebacteria suitable for use in the present invention have been deposited with the United States Department of Agriculture, Northern Utilization Research and Development Division, Peoria, Illinois, for addition to the permanent collection of microorganisms maintained by that organization. The species thus submitted and their identification numbers are as follows:

*Corynebacterium lilium*, 2088–17A–NRRL–B–2243
*Corynebacterium callunae*, 2088–17B–NRRL–B–2244

We claim:
1. A process which comprises aerobically fermenting an aqueous carbohydrate medium containing a nitrogen source and a biological catalyst system produced by a microorganism selected from the group consisting of *Corynebacterium lilium* NRRL–B–2243 and *Corynebacterium callunae* NRRL–B–2244.

2. The process of claim 1 wherein said carbohydrate is sugar.

3. A process for preparing L-glutamic acid which comprises aerobically fermenting an aqueous carbohydrate containing a nitrogen source and a biological catalyst system produced by a microorganism selected from the group consisting of *Corynebacterium lilium* NRRL–B–2243 and *Corynebacterium callunae* NRRL–B–2244 and recovering glutamic acid therefrom.

4. The process of claim 3 wherein said microorganism is *Corynebacterium lilium* NRRL–B–2243.

5. The process of claim 3 wherein said microorganism is *Corynebacterium callunae* NRRL–B–2244.

6. The process of claim 3 wherein said carbohydrate is sugar.

7. The process of claim 6 wherein the sugar is selected from the group consisting of glucose, sucrose, fructose, and maltose and the fermentation is conducted at a temperature between about 25° and about 35° C.

8. A process for producing L-glutamic acid which comprises aerobically fermenting an aqueous mixture containing sugar and an nitrogen source at a temperature between about 20° C. and about 40° C. and at a pH between about 5 and about 9 with an organism selected from the group consisting of *Corynebacterium lilium* NRRL–B–2243 and *Corynebacterium callunae* NRRL–B–2244, continuing the fermentation under said conditions until the growth of the organisms reaches a maximum, then continuing the fermentation at a pH between about 6 and about 8 and recovering L-glutamic acid from the fermentation medium.

9. The process of claim 8 wherein said microorganism is *Corynebacterium lilium* NRRL–B–2243.

10. The process of claim 8 wherein said microorganism is *Corynebacterium callunae* NRRL–B–2244.

11. The process of claim 8 wherein the sugar is selected from the group consisting of glucose, sucrose, fructose and maltose and the fermentation is conducted at a temperature between about 25° and about 35° C.

12. A process for producing L-glutamic acid which comprises aerobically fermentating an aqueous medium containing glucose and a nitrogen source, with a biological catalyst system produced by the microorganism *Corynebacterium lilium* NRRL–B–2243 at a temperature between about 20° and about 40° C. and recovering glutamic acid therefrom.

13. The process for producing L-glutamic acid which comprises aerobically fermenting an aqueous medium containing from about 5% to about 20% by weight of glucose, and a nitrogen source with a microorganism *Corynebacterium lilium* NRRL–B–2243 at a temperature between about 25° C. and about 35° C. and a pH between about 6 and about 8 and recovering glutamic acid therefrom.

14. A process for producing L-glutamic acid which comprises aerobically fermenting an aqueous medium containing sucrose and a nitrogen source, with a biological catalyst system produced by the microorganism *Corynebacterium lilium* NRRL–B–2243 at a temperature between about 20° C. and about 40° C. and recovering glutamic acid therefrom.

15. The process for producing L-glutamic acid which comprises aerobically fermenting an aqueous medium containing from about 5% to about 20% by weight of sucrose, and a nitrogen source with a microorganism *Corynebacterium lilium* NRRL–B–2243 at a temperature between about 25° C. and about 35° C. and recovering glutamic acid therefrom.

References Cited in the file of this patent

UNITED STATES PATENTS

| | | |
|---|---|---|
| 2,500,825 | Hutchings | Mar. 14, 1950 |
| 2,749,279 | Smythe | June 5, 1956 |
| 3,003,925 | Kinoshita et al. | Oct. 10, 1961 |

FOREIGN PATENTS

| | | |
|---|---|---|
| 216,245 | Australia | July 28, 1958 |

OTHER REFERENCES

Proceedings of the International Symposium on Enzyme Chemistry, Tokyo and Kyoto, 1947, pages 464 to 468, published 1958, Maruzen, Tokyo.

Archives of Biochemistry and Biophysics, 1955, vol. 55, pages 307–309.

Chemical Abstracts, 1957, vol. 51, 7643–7644.

Kinoshita et al.: "Taxonomical Study of Glutamic Acid Accumulating Bacteria, etc." Bulletin of the Agricultural Society of Japan, 1959, Tokyo.